(12) United States Patent
Hirose

(10) Patent No.: US 10,218,912 B2
(45) Date of Patent: Feb. 26, 2019

(54) INFORMATION PROCESSING APPARATUS, METHOD OF CONTROLLING IMAGE DISPLAY, AND STORAGE MEDIUM

(71) Applicant: CANON KABUSHIKI KAISHA, Tokyo (JP)

(72) Inventor: Eiko Hirose, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 60 days.

(21) Appl. No.: 15/632,701

(22) Filed: Jun. 26, 2017

(65) Prior Publication Data

US 2018/0007279 A1    Jan. 4, 2018

(30) Foreign Application Priority Data

Jun. 30, 2016  (JP) .................. 2016-130766

(51) Int. Cl.
| | |
|---|---|
| *H04N 1/00* | (2006.01) |
| *H04N 1/21* | (2006.01) |
| *H04N 5/232* | (2006.01) |
| *H04N 5/445* | (2011.01) |
| *G06F 3/0482* | (2013.01) |

(52) U.S. Cl.
CPC ..... *H04N 5/232933* (2018.08); *G06F 3/0482* (2013.01); *H04N 1/00453* (2013.01); *H04N 1/2175* (2013.01); *H04N 5/23206* (2013.01); *H04N 5/23245* (2013.01); *H04N 5/23293* (2013.01); *H04N 5/232939* (2018.08); *H04N 5/44543* (2013.01)

(58) Field of Classification Search
CPC .... H04N 1/217; H04N 1/2175; H04N 1/0044; H04N 1/00453; H04N 5/23206; H04N 5/23245; H04N 5/23293; H04N 5/232933; H04N 5/232939
See application file for complete search history.

(56) References Cited

U.S. PATENT DOCUMENTS

| | | | | |
|---|---|---|---|---|
| 2008/0222558 | A1* | 9/2008 | Cho | G06F 3/0481 715/784 |
| 2008/0295031 | A1* | 11/2008 | Miyazaki | G11B 27/322 715/835 |
| 2010/0125786 | A1* | 5/2010 | Ozawa | G06F 3/04845 715/702 |
| 2010/0134425 | A1* | 6/2010 | Storrusten | G06F 3/0425 345/173 |
| 2010/0208119 | A1* | 8/2010 | Yoshimi | G06F 3/03547 348/333.01 |

(Continued)

FOREIGN PATENT DOCUMENTS

JP   2012-14519 A   1/2012

*Primary Examiner* — Daniel M Pasiewicz
(74) *Attorney, Agent, or Firm* — Carter, Deluca, Farrell & Schmidt LLP

(57) ABSTRACT

If an operation to switch a first display mode to a second display mode is performed by a user, a display size of an image that is displayed in the first display mode is compared with a minimum display size that is associated with the second display mode. If the display size of the image that is displayed in the first display mode is smaller than the minimum display size in the second display mode, the display size is changed into the minimum display size in the second display mode and the image is displayed on the display screen in a changed display size.

15 Claims, 7 Drawing Sheets

(56) References Cited

U.S. PATENT DOCUMENTS

| | | | | |
|---|---|---|---|---|
| 2010/0283743 A1* | 11/2010 | Coddington | .......... | G06F 3/0485 |
| | | | | 345/173 |
| 2011/0154196 A1* | 6/2011 | Icho | ...................... | G06F 3/0485 |
| | | | | 715/702 |
| 2014/0078184 A1* | 3/2014 | Sumita | ...................... | G06T 3/40 |
| | | | | 345/667 |
| 2015/0227298 A1* | 8/2015 | Kim | .................... | G06F 3/04845 |
| | | | | 715/799 |
| 2017/0262250 A1* | 9/2017 | Tanabe | .................. | G06F 3/1462 |

* cited by examiner

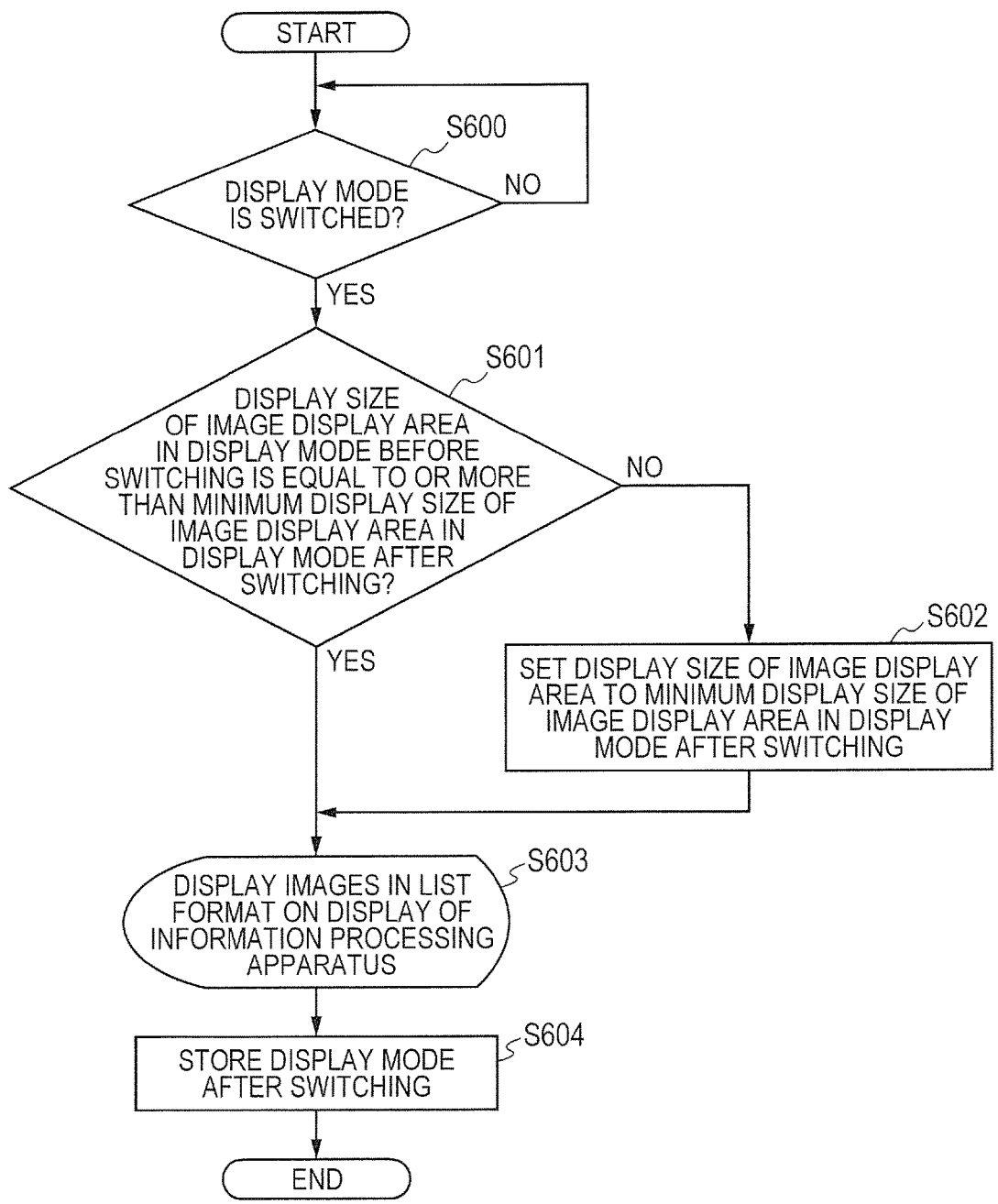

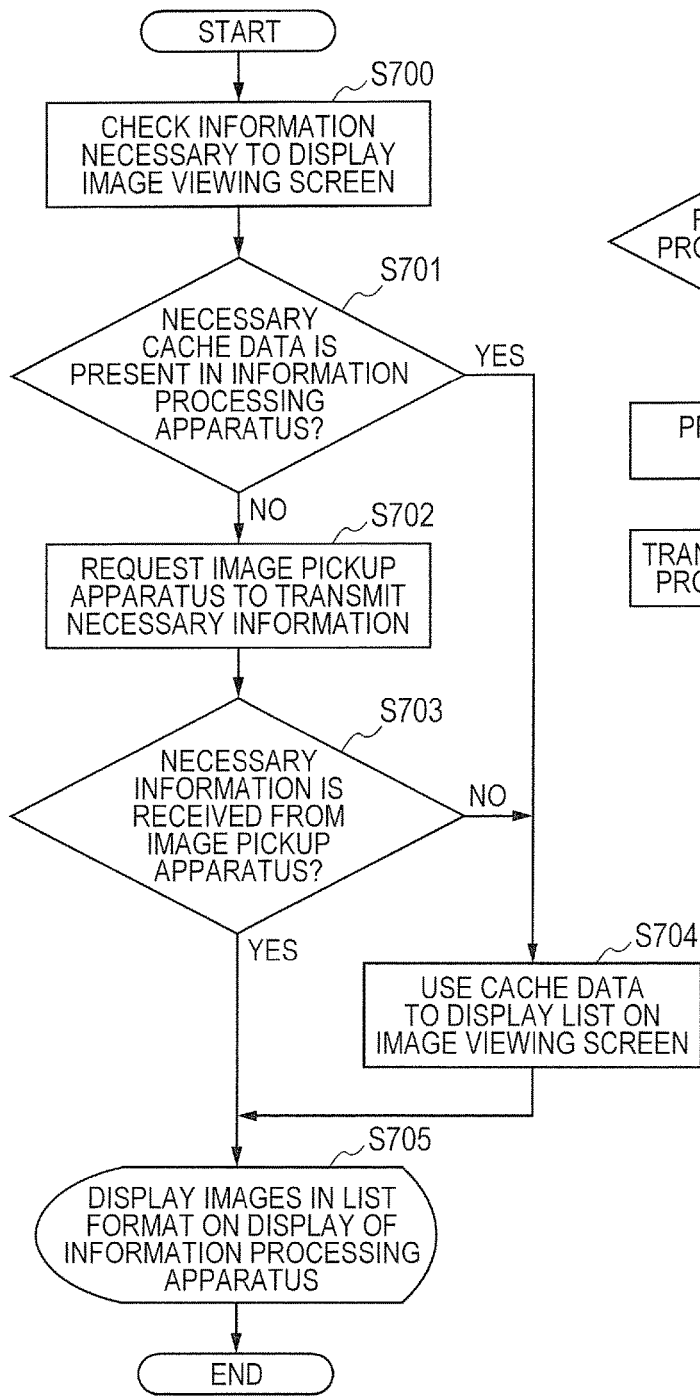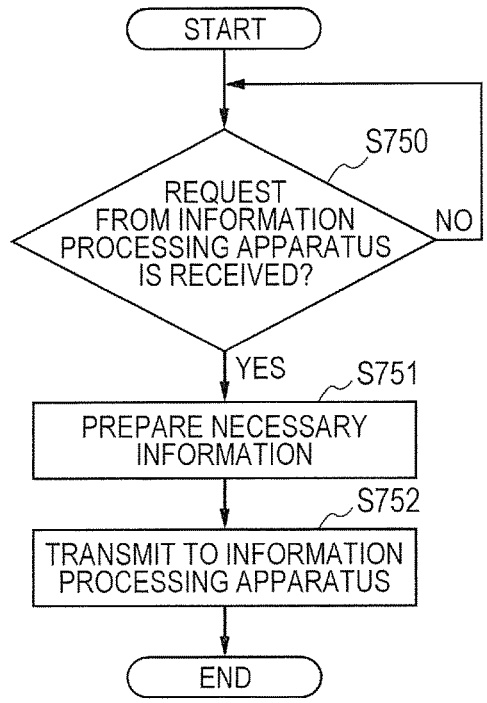

INFORMATION PROCESSING APPARATUS, METHOD OF CONTROLLING IMAGE DISPLAY, AND STORAGE MEDIUM

BACKGROUND OF THE INVENTION

Field of the Invention

The present invention relates to an information processing apparatus, a method of controlling image display, and a storage medium.

Description of the Related Art

Equipping a digital camera and other image pickup apparatus with a communication function has been proposed in recent years. A technology is also proposed with which communication is held between this type of image pickup apparatus and a cellular phone or a similar information processing apparatus to display, in a list format, images recorded on the image pickup apparatus on a display screen of the information processing apparatus. Using this technology enables a user to view images that are stored in the image pickup apparatus on the display screen of the information processing apparatus in addition to a display screen of the image pickup apparatus. The images are displayed in a list format in a plurality of modes including a normal mode, an image selection mode, and a detailed information display mode, and the purpose and the use vary from mode to mode.

In Japanese Patent Application Laid-Open No. 2012-14519, there are disclosed displaying on a display screen an image in a single-image play mode or images in a multi-image play mode, and changing the size of displayed images depending on how many images are displayed at once.

However, a change in the display size of an image that follows a switch from one image display mode to another sometimes lessens the ease of viewing and the ease of operation for the user.

SUMMARY OF THE INVENTION

According to one aspect of an embodiment, there is provided an information processing apparatus, including: a display controller configured to exert control such that an image is displayed on a display screen in one of a plurality of display modes, the plurality of display modes including a first display mode and a second display mode; and a first comparison unit configured to compare, when the first display mode is switched to the second display mode, a display size of the image that is displayed on the display screen in the first display mode and a given display size that is associated with the second display mode, wherein the display controller is configured to exert control such that the image is displayed on the display screen in the second display mode in either the given display size that is associated with the second display mode or the display size of the image that is displayed in the first display mode, based on a result of the comparison by the first comparison unit.

According to another aspect of an embodiment, there is provided a method of controlling image display, including: conducting a first comparison when a first display mode is switched to a second display mode out of a plurality of display modes, the first comparison being a comparison between a display size of an image that is displayed on a display screen in the first display mode and a given display size that is associated with the second display mode; and exerting control such that the image is displayed on the display screen in the second display mode in either the given display size that is associated with the second display mode or the display size of the image that is displayed in the first display mode, based on a result of the first comparison.

Further features of the present invention will become apparent from the following description of exemplary embodiments with reference to the attached drawings.

BRIEF DESCRIPTION OF THE DRAWINGS

FIG. 6 is a flow chart for illustrating the operation of the information processing apparatus according to the embodiment.

FIG. 7A and FIG. 7B are flow charts for respectively illustrating the operation of the information processing apparatus and the operation of the image pickup apparatus according to the embodiment.

DESCRIPTION OF THE EMBODIMENTS

Preferred embodiments of the present invention will now be described in detail in accordance with the accompanying drawings. The present invention is not limited to the following embodiment, and various modifications can be made without departing from the spirit of the present invention. For instance, an adjustment or a modification can be made to suit the configuration of an apparatus to which the present invention is applied, or to suit various conditions.

Embodiment

An information processing apparatus and a method of controlling image display according to an embodiment of the present invention are described with reference to FIG. 1A to FIG. 8E.

<Image Pickup Apparatus>

Figure 1A:
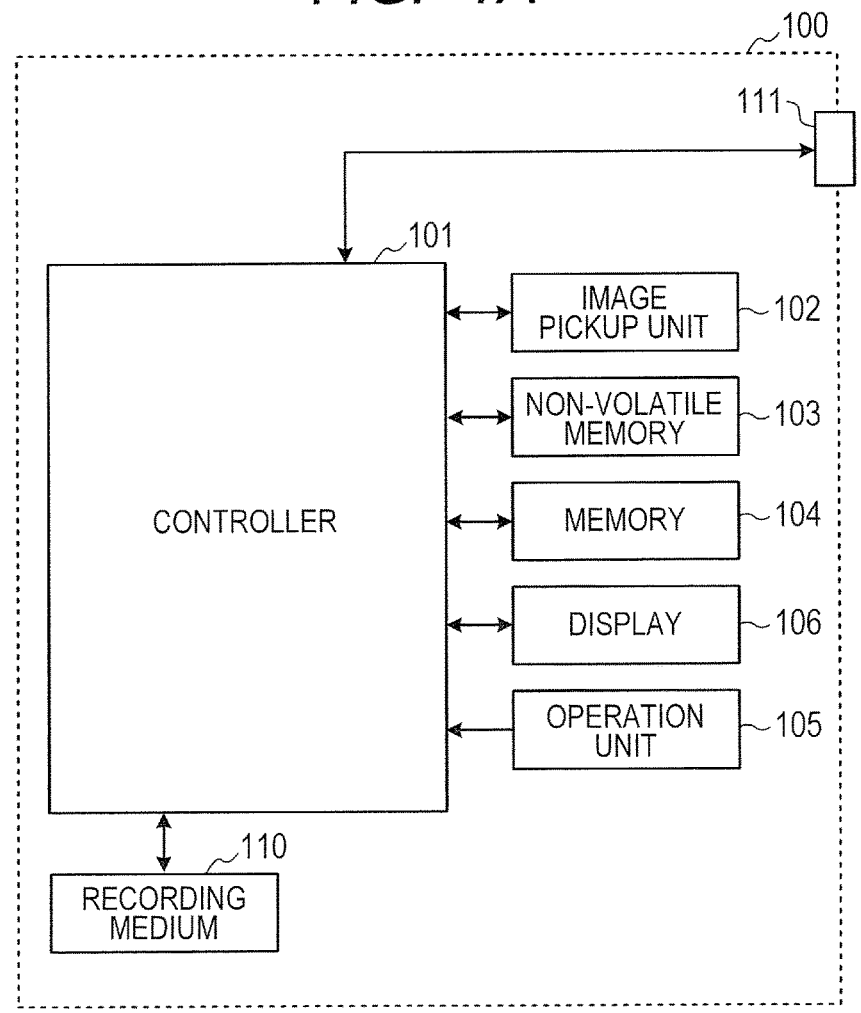
FIG. 1A, FIG. 1B, and FIG. 1C are block diagrams for illustrating an image pickup apparatus according to an embodiment of the present invention.
Figure 1B:
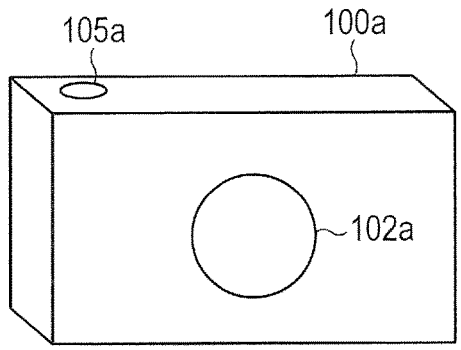
Figure 1C:
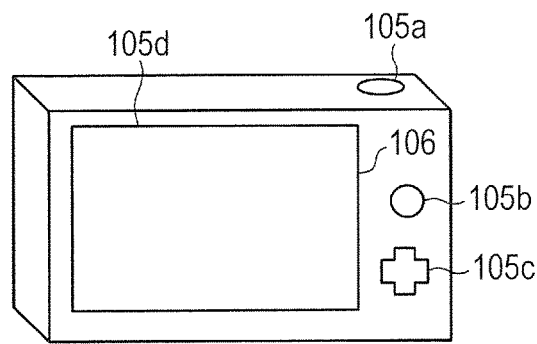

Before the information processing apparatus according to the embodiment is described, a description is given with reference to FIG. 1A to FIG. 1C on an image pickup apparatus configured to hold communication to and from the information processing apparatus according to the embodiment. FIG. 1A to FIG. 1C are diagrams for illustrating an image pickup apparatus according to the embodiment. FIG. 1A is a block diagram for illustrating the configuration of the image pickup apparatus according to the embodiment. The description given here takes as an example a case where an image pickup apparatus 100 is a digital camera. However, the image pickup apparatus 100 is not limited to a digital camera and may be, for example, an information processing apparatus equipped with an image pickup unit. Examples of this type of information processing apparatus include portable media players, tablet devices, and personal computers.

A controller 101 handles overall control of the image pickup apparatus 100. The controller 101 is configured to control components of the image pickup apparatus 100 in accordance with signals input into the controller 101 and a program that is described later. While the description given here takes as an example a case where one controller 101, namely, one piece of hardware, performs the overall control of the image pickup apparatus 100, the task of overall control of the image pickup apparatus 100 may instead be shared by a plurality of pieces of hardware.

An image pickup unit 102 is configured to convert an object image that is formed by a lens unit 102a (see FIG. 1B) into an analog electric signal, and generate a digital signal by performing A/D conversion or the like on the analog electric signal. The image pickup unit 102 generates image data by performing noise reduction processing or other similar processing on the thus obtained digital signal, and outputs the generated image data. The image data output from the image pickup unit 102 is temporarily stored in a memory 104, which functions as a buffer memory. The controller 101 performs given image processing on this image data, and records the image data processed by the given image processing on a recording medium 110.

A non-volatile memory 103 is a non-volatile memory on which data can be erased and recorded electrically, and is configured to store, among others, a program that is executed by the controller 101 and described later.

As described above, the memory 104 can function as a buffer memory in which image data output from the image pickup unit 102 is stored temporarily. The memory 104 can also function as an image display memory to be used when an image is displayed by a display 106. Other uses of the memory 104 include one in which the memory 104 serves as a work area of the controller 101.

An operation unit 105 is used to receive an instruction issued by a user to the image pickup apparatus 100. The operation unit 105 includes, for example, a power button with which powering the image pickup apparatus 100 on/off is instructed, a release switch 105a with which taking an image is instructed, and a play button with which playback of image data is instructed. The operation unit 105 further includes, among others, a connection button used to start communication to and from an external device via a connection unit 111, which is described later. A touch panel 105d, which is included in the display 106 described later, is also a part of the operation unit 105. The release switch 105a includes a first switch (not shown) and a second switch (not shown). The first switch is switched on by pressing the release switch 105a halfway down. With the first switch switched on, the controller 101 receives an instruction for making photographing preparations, which include auto focus (AF) processing, auto exposure (AE) processing, auto white balance (AWB) processing, and electronic flash (EF, preliminary flashing) processing. The second switch is switched on by pressing the release switch 105a all the way down. With the second switch switched on, the controller 101 receives an instruction to take an image.

The display 106 is configured to display, for example, a view for live view photographing, photographed image data, various setting menus, and text for interactive operation. The display 106 is not required to be built in the image pickup apparatus 100. In the case where the display 106 is placed outside the image pickup apparatus 100 and connected to the image pickup apparatus 100, the image pickup apparatus 100 only needs to have a display control function for controlling display on the display 106. In the case where the image pickup apparatus 100 includes an electronic viewfinder, the electronic viewfinder is a part of the display 106 as well.

The recording medium 110 is configured to record image data obtained with the use of the image pickup unit 102. The recording medium 110 may or may not be detachable from the image pickup apparatus 100. The image pickup apparatus 100 only needs to include a unit configured to access the recording medium 110 in the case where the recording medium 110 is detachable from the image pickup apparatus 100.

The connection unit 111 is an interface configured to connect to an external device, for example, an information processing apparatus 200 according to the embodiment which is described later. The image pickup apparatus 100 according to the embodiment is capable of receiving data from and sending data to the information processing apparatus 200 via the connection unit 111. For example, image data obtained with the use of the image pickup unit 102 can be transmitted to an external device via the connection unit 111. The connection unit 111 is an antenna, for example. The controller 101 can connect the image pickup apparatus 100 to the information processing apparatus 200 via the connection unit 111. The image pickup apparatus 100 and the information processing apparatus 200 may be connected to each other directly or through an access point. The connection unit 111 can be an interface configured to hold communication to and from an external device over a wireless LAN. A protocol that can be used for data communication between the image pickup apparatus 100 and the information processing apparatus 200 is, for example, the Picture Transfer Protocol over Internet Protocol (PTP/IP) conducted over a wireless LAN. Examples of the standard for the wireless LAN include IEEE 802.11. The controller 101 establishes wireless communication to and from an external device by controlling the connection unit 111. The method of wireless communication between the image pickup apparatus 100 and the information processing apparatus 200 is not limited to a wireless LAN. For example, the connection unit 111 can be an infrared communication module, a Bluetooth (trademark) communication module, a wireless USB module, or other wireless communication modules. Connection between the image pickup apparatus 100 and the information processing apparatus 200 is not limited to wireless connection and may be wired connection. For example, a USB cable, an HDMI (trademark) cable, or an IEEE 1394 cable may be used to connect the image pickup apparatus 100 and the information processing apparatus 200 in a wired manner. The connection unit 111 can function as the following communication unit. That is, the connection unit 111 can function as a communication unit configured to transmit to the information processing apparatus 200 related data that is related to image data stored in the image pickup apparatus 100, namely, a header, a thumbnail image, and the like, through communication to and from the information processing apparatus 200. The connection unit 111 can also function as a communication unit configured to transmit to the information processing apparatus 200 image data that is stored in the image pickup apparatus 100 through communication to and from the information processing apparatus 200.

FIG. 1B is a perspective view of the image pickup apparatus 100 viewed from its front side. FIG. 1C is a perspective view of the image pickup apparatus 100 viewed from its rear side. As illustrated in FIG. 1B, the lens unit 102a is provided on the front side of a body 100a of the image pickup apparatus 100. The release switch 105a, which is a part of the operation unit 105, is provided on a top surface of the body 100a of the image pickup apparatus 100. As illustrated in FIG. 1C, the play button 105b and a direction key 105c, which are a part of the operation unit 105, are provided on the rear side of the body 100a of the image pickup apparatus 100. The display 106 is also provided on the rear side of the image pickup apparatus 100. In the case where the display 106 is the touch panel 105d, the touch panel 105d forms a part of the operation unit 105.

<Information Processing Apparatus>

Figure 2:
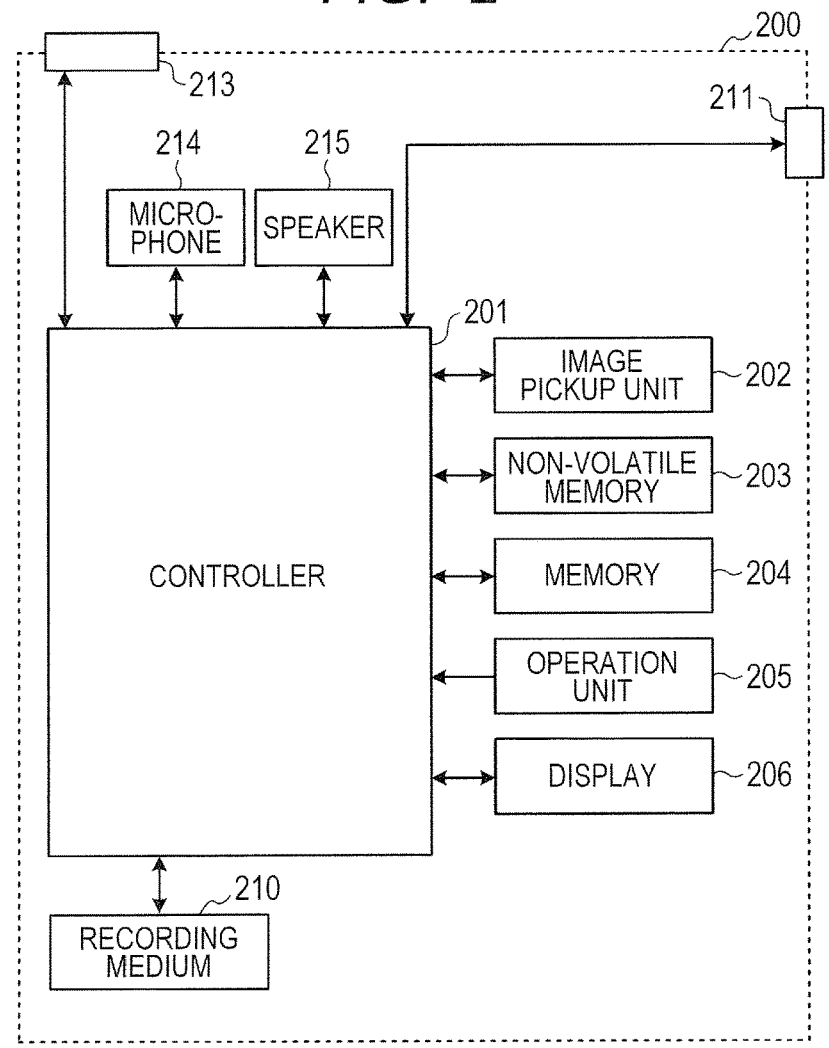
FIG. 2 is a block diagram for illustrating an information processing apparatus according to the embodiment.

The information processing apparatus according to the embodiment is described next with reference to FIG. 2. FIG. 2 is a block diagram for illustrating an example of the information processing apparatus according to the embodiment. The description given here takes as an example a case where the information processing apparatus 200 according to the embodiment is a cellular phone. However, the information processing apparatus 200 according to the embodiment is not limited to a cellular phone. A wide variety of information processing apparatus equipped with a communication function (a communication unit) can be used as the information processing apparatus 200. Examples of this type of information processing apparatus 200 include digital cameras, portable media players, tablet devices, personal computers, and smartphones.

A controller 201 handles overall control of the information processing apparatus 200. The controller 201 is configured to control components of the information processing apparatus 200 in accordance with signals input into the controller 201 and a program that is described later. The controller 201 can function as the following display controller. That is, the controller 201 can function as a display controller configured to exert control such that image viewing screens 816a to 816d (see FIG. 8A to FIG. 8E) are displayed in one of a plurality of display modes 300 to 303 (see FIG. 3). The controller 201 can also function as a display controller configured to exert control such that an image is displayed in each image display area 802, which is set in the image viewing screens 816a to 816d. The controller 201 can also function as a display controller configured to display an image corresponding to image data that is stored in the image pickup apparatus 100 or other external apparatus on a display screen of a display 206. When the user operates the information processing apparatus 200 to switch from one display mode to another, the controller 201 can also function as the following determination unit. That is, the controller 201 can function as a determination unit configured to determine whether or not the display size of the image display area 802 that is set in the display mode before switching is smaller than a minimum display size in the display mode after switching. The controller 201 can also function as the following display size setting unit. That is, the controller 201 can function as a display size setting unit configured to execute the following processing when the display size of the image display area 802 that is set in the display mode before switching is smaller than the minimum display size in the display mode after switching. That is, the controller 201 can function as a display size setting unit configured to set the display size of the image display area 802 to the minimum display size in the display mode after switching when one display mode is switched to another display mode and the image display area 802 is set in the image viewing screens 816a to 816d. While the description given here takes as an example a case where one controller 201, namely, one piece of hardware, performs the overall control of the information processing apparatus 200, the task of overall control of the information processing apparatus 200 may instead be shared by a plurality of pieces of hardware.

An image pickup unit 202 is configured to convert an object image that is formed by the lens unit 102a into an analog electric signal, and generate a digital signal by performing A/D conversion or the like on the analog electric signal. The image pickup unit 202 generates image data by performing noise reduction processing or other similar processing on the thus obtained digital signal, and outputs the generated image data. The image data output from the image pickup unit 202 is temporarily stored in a memory 204, which functions as a buffer memory. The controller 201 performs given image processing on this image data, and records the image data processed by the given image processing on a recording medium 210.

A non-volatile memory 203 is a non-volatile memory on which data can be erased and recorded electrically. What is recorded in the non-volatile memory 203 includes an operating system (OS), which is basic software executed by the controller 201, and an application program that cooperates with the OS to implement an applied function. The non-volatile memory 203 also stores a communication application program, which is used to hold communication to and from the image pickup apparatus 100.

As described above, the memory 204 can function as a buffer memory in which image data output from the image pickup unit 202 is stored temporarily. The memory 204 can also function as an image display memory used when an image is displayed by the display 206. Other uses of the memory 204 include one in which the memory 204 serves as a work area of the controller 201.

An operation unit 205 is used to receive an instruction issued by a user to the information processing apparatus 200. The operation unit 205 includes, for example, a power button with which powering the information processing apparatus 200 on/off is instructed. A touch panel, which is included in the display 206 described later, is also a part of the operation unit 205.

The display 206 is configured to display image data and text for interactive operation. The display 206 is not required to be built in the information processing apparatus 200. In the case where the display 206 is placed outside the information processing apparatus 200 and connected to the image pickup apparatus 200, the information processing apparatus 200 only needs to have a display control function (display controller) for controlling display on the display 206.

The recording medium 210 is configured to record image data thereon. The image data to be recorded is image data obtained with the use of the image pickup unit 202 in some cases, and is image data received from the image pickup apparatus 100 as described later in other cases. The recording medium 210 may or may not be detachable from the information processing apparatus 200. The information processing apparatus 200 only needs to include a unit configured to access the recording medium 210 in the case where the recording medium 210 is detachable from the information processing apparatus 200.

The connection unit 211 is an interface configured to connect to an external device, for example, the image pickup apparatus 100. The information processing apparatus 200 according to the embodiment is capable of receiving data from and sending data to the image pickup apparatus 100 via the connection unit 211. For example, image data from the image pickup apparatus 100 can be received via the connection unit 211. The connection unit 211 is an antenna, for example. The controller 201 can connect the information processing apparatus 200 to the image pickup apparatus 100 via the connection unit 211. The image pickup apparatus 100 and the information processing apparatus 200 may be connected to each other directly or through an access point. The connection unit 211 can be an interface configured to hold communication to and from an external device over a wireless LAN. As described above, a protocol that can be used for data communication between the image pickup apparatus 100 and the information processing apparatus 200 is, for example, the PTP/IP conducted over a wireless LAN. Examples of the standard for the wireless LAN include IEEE 802.11. The controller 201 establishes wireless communication to and from an external device by controlling the connection unit 211. The method of wireless communication between the image pickup apparatus 100 and the information processing apparatus 200 is not limited to a wireless LAN. For example, the connection unit 211 can be an infrared communication module, a Bluetooth (trademark) communication module, a wireless USB module, or other wireless communication modules. Connection between the image pickup apparatus 100 and the information processing apparatus 200 is not limited to wireless connection and may be wired connection. For example, a USB cable, an HDMI (trademark) cable, or an IEEE 1394 cable may be used to connect the image pickup apparatus 100 and the information processing apparatus 200 in a wired manner. The connection unit 211 can function as the following communication unit. That is, the connection unit 211 can function as a communication unit configured to receive related data that is related to image data stored in the image pickup apparatus 100, namely, a header, a thumbnail image, and the like, through communication to and from the image pickup apparatus 100. The connection unit 211 can also function as a communication unit configured to receive image data that is stored in the image pickup apparatus 100 through communication to and from the image pickup apparatus 100.

A public network connection unit 213 is an interface used for public wireless communication. The information processing apparatus 200 can make a phone call to and from other information processing apparatus, specifically, a cellular phone or the like, via the public network connection unit 213. The controller 201 establishes a phone call by inputting and outputting an audio signal via a microphone 214 and a speaker 215. The public network connection unit 213 is, for example, an antenna. The controller 201 can connect to a public network via the public network connection unit 213. The connection unit 211 and the public network connection unit 213 may be implemented by a single antenna. The controller 201 and the public network connection unit 213 can function together as a phone call unit configured to establish a phone call between the information processing apparatus 200 and another information processing apparatus (not shown).

The operation of the image pickup apparatus 100 and information processing apparatus 200 according to the embodiment is described below with reference to FIG. 3 to FIG. 8E. The following description reads in some places as though the information processing apparatus 200 is the one that executes processing. In actuality, however, the controller 201 included in the information processing apparatus 200 carries out various types of processing by reading a program that is stored in the non-volatile memory 203. The following description also reads in some places as though the image pickup apparatus 100 is the one that executes processing. In actuality, however, the controller 101 included in the image pickup apparatus 100 carries out various types of processing by reading a program that is stored in the non-volatile memory 103.

<System Configuration and Operation Outline>

Communication can be established between the image pickup apparatus 100 and the information processing apparatus 200. Communication between the image pickup apparatus 100 and the information processing apparatus 200 may be held directly by the image pickup apparatus 100 and the information processing apparatus 200, or through an access point. Once communication is established between the image pickup apparatus 100 and the information processing apparatus 200, the user can use the information processing apparatus 200 to conduct the following. That is, the user can view image data that is recorded in the image pickup apparatus 100 on the display 206 of the information processing apparatus 200. The user can also select image data of his or her choice on the information processing apparatus 200 out of pieces of image data that are recorded in the image pickup apparatus 100, and can save the selected pieces of image data in the information processing apparatus 200. This operation is implemented by, for example, an application program introduced into the information processing apparatus 200.

Figure 8A:
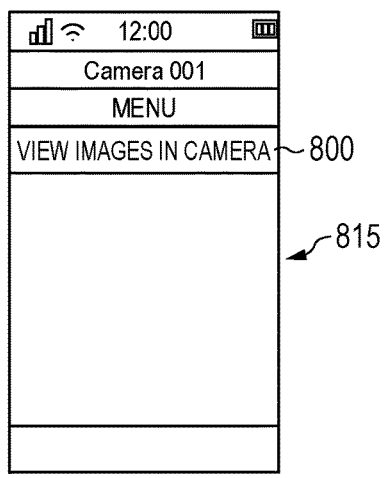
FIG. 8A, FIG. 8B, FIG. 8C, FIG. 8D, and FIG. 8E are diagrams for illustrating an example of a display screen of the information processing apparatus according to the embodiment.
Figure 8D:
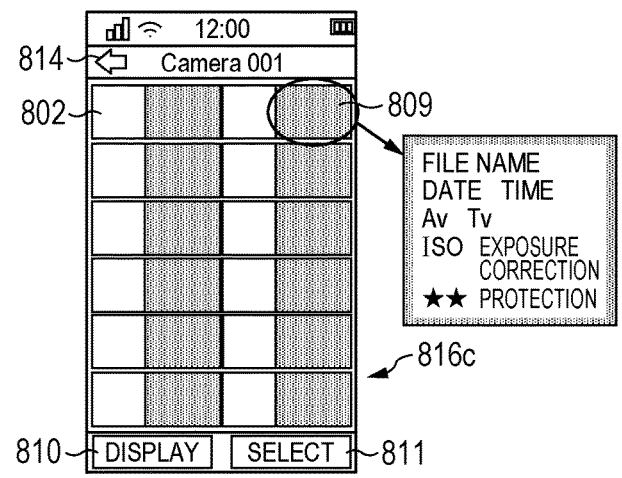
Figure 8B:
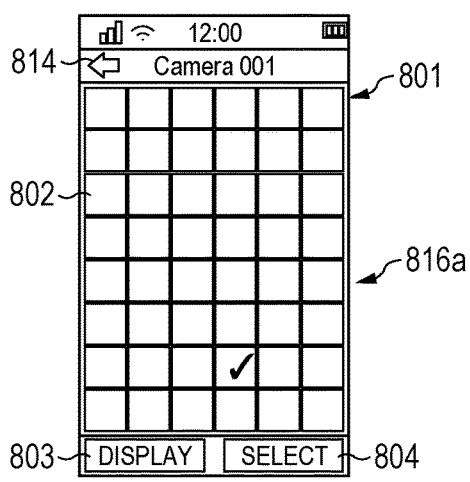
Figure 8E:
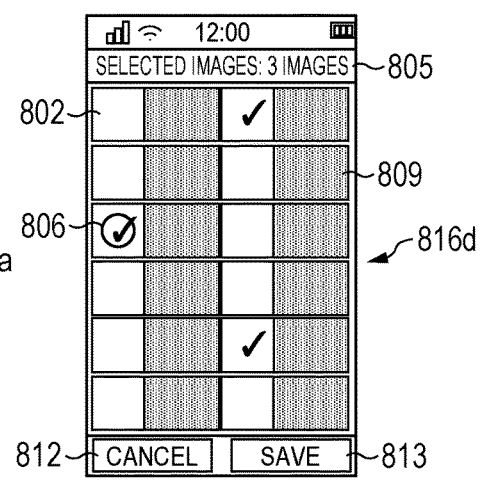
Figure 8C:
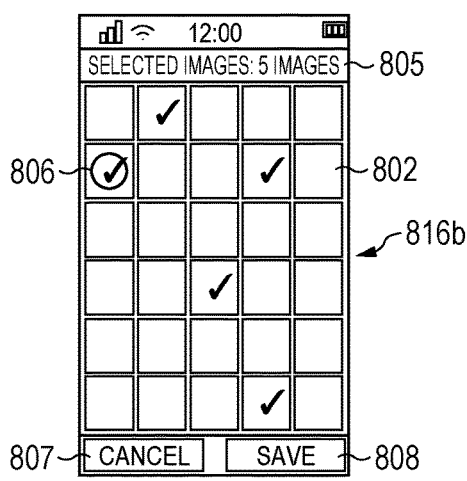

The information processing apparatus 200 displays a menu screen 815 such as the one illustrated in FIG. 8A on the display screen of the display 206 when communication is established between the image pickup apparatus 100 and the information processing apparatus 200. The menu screen 815 displays a menu item for a transition of the display screen of the display 206 from the menu screen 815 to one of the image viewing screens 816a to 816d. As described later, the information processing apparatus 200 according to the embodiment displays the image viewing screens 816a to 816d on the display 206 in a plurality of display modes. Specifically, the display modes include a normal mode, an image selection mode, a detailed information display mode, and a detailed information display and image selection mode. An image viewing screen in the normal mode is denoted by the symbol 816a as illustrated in FIG. 8B. An image viewing screen in the image selection mode is denoted by the symbol 816b as illustrated in FIG. 8C. An image viewing screen in the detailed information display mode is denoted by the symbol 816c as illustrated in FIG. 8D. An image viewing screen in the detailed information display and image selection mode is denoted by the symbol 816d as illustrated in FIG. 8E. The image viewing screens are denoted by the symbol 816 when the description does not discriminate one display mode from another.

The user can view image data that is recorded in the image pickup apparatus 100 on the image viewing screen 816, which is displayed on the display 206 of the information processing apparatus 200. The user can also view detailed information on image data that is recorded in the image pickup apparatus 100 on the image viewing screens 816c and 816d, which are displayed on the display 206 of the information processing apparatus 200. The user can select image data of his or her choice on the information processing apparatus 200 out of pieces of image data that are recorded in the image pickup apparatus 100, and can save the selected pieces of image data in the information processing apparatus 200.

FIG. 8A is a diagram for illustrating an example of the menu screen 815, which is displayed on the display 206 of the information processing apparatus 200. An image viewing button 800 displayed on the menu screen 815 is a button to cause a transition of the display screen of the display 206 to one of the image viewing screens 816 on which images recorded in the image pickup apparatus 100 are viewed. When the press of the image viewing button 800 is detected, the information processing apparatus 200 requests the image pickup apparatus 100 to transmit an image list to the information processing apparatus 200. The image pickup apparatus 100 uniquely assigns an identifier ID for managing a data group, which includes a piece of image data and related data that is related to this piece of image data, to the data group. The related data includes a header, a thumbnail image, and the like. The image list is a list of IDs, each of which is assigned to one of all data groups recorded in the image pickup apparatus 100. When the information processing apparatus 200 requests the image pickup apparatus 100 to transmit image data and its related data, the ID is used to specify the image data and the related data. Before displaying the image viewing screen 816 on the display 206, the information processing apparatus 200 requests the image pickup apparatus 100 to transmit, for each ID included in the image list, related data that is included in a data group to which the ID is assigned, specifically, a header, a thumbnail image, and the like. The information processing apparatus 200 displays, in a list format, thumbnails transmitted sequentially from the image pickup apparatus 100 to the information processing apparatus 200 on the image viewing screen 816 displayed on the display 206. When the thumbnail images are displayed in a list format on the image viewing screen 816, the image display areas 802 are set in a display area 801 of the image viewing screen 816 as illustrated in FIG. 8B. The thumbnail images are displayed so that each thumbnail image is inscribed in one of the image display areas 802 while maintaining the aspect ratio of the thumbnail image.

Figure 3:
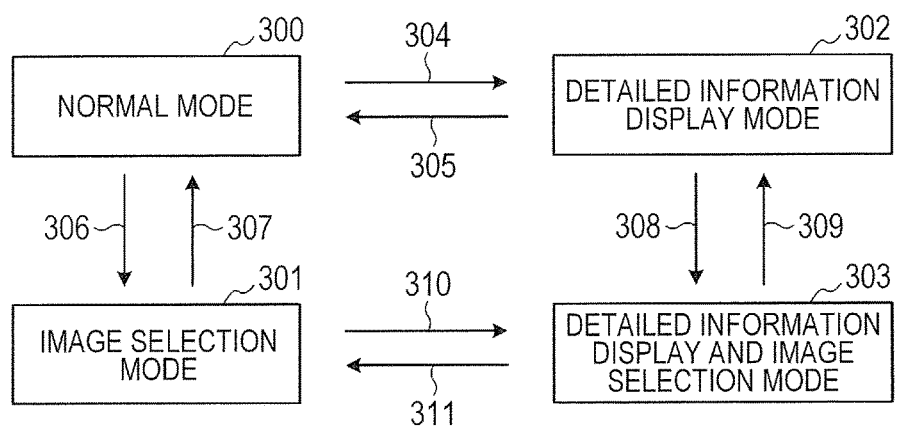
FIG. 3 is a diagram for illustrating display modes in the information processing apparatus according to the embodiment.

FIG. 3 is a diagram for illustrating display modes in the information processing apparatus according to the embodiment. The information processing apparatus 200 displays the image viewing screen 816 in one display mode selected from the plurality of display modes 300 to 303. The normal mode 300, the image selection mode 301, the detailed information display mode 302, and the detailed information display and image selection mode 303 make up the plurality of display modes 300 to 303. The normal mode 300 and the detailed information display mode 302 are display modes in which the user does not select an image on the image viewing screen 816. The image selection mode 301 and the detailed information display and image selection mode 303 are display modes in which the user selects an image on the image viewing screen 816. When the user presses the image viewing button 800 (see FIG. 8A), a transition from the menu screen 815 (see FIG. 8A) to the image viewing screen 816 takes place. The default display mode for a transition from the menu screen 815 to the image viewing screen 816a is the normal mode 300. An example of what image viewing screen is displayed in the normal mode 300 is illustrated in FIG. 8B. A value common to all display modes is set as the default display size of each image display area 802. In the case of a transition from the menu screen 815 illustrated in FIG. 8A to the image viewing screen 816a illustrated in FIG. 8B, the information processing apparatus 200 displays each image display area 802 on the image viewing screen 816a in a size that is the default display size in the normal mode 300.

Thumbnail images of image data recorded in the image pickup apparatus 100 are displayed in a list format on the image viewing screen 816 displayed on the display 206 of the information processing apparatus 200 as follows. That is, the information processing apparatus 200 sequentially displays the thumbnail images in an order that is set in advance in an application program, for example, an order starting from the upper left corner of the display area 801. When not all thumbnail images of pieces of image data recorded in the image pickup apparatus 100 can be displayed in the display area 801 of the image viewing screen 816, the following processing is executed. That is, thumbnail images displayed in the display area 801 are moved in accordance with the user's scrolling operation, thereby ensuring that the user can view all thumbnail images. The user can scroll the image viewing screen 816 by sliding a finger over the display area 801 in which thumbnail images are displayed in a list format. The user may scroll the image viewing screen 816 by operating a scroll bar (not shown) that is displayed on the display 206. The information processing apparatus 200 enlarges or reduces the display size of the image display area 802 in response to an enlargement operation or a reduction operation that is performed by the user. The user can enlarge or reduce the display size of the image display area 802 by a pinching operation, for example. The display size of the image display area 802 may be enlarged or reduced also by displaying an icon for an enlargement operation and a reduction operation, or other screen objects, on the display 206 and allowing the user to operate the icon or other screen objects. The degree of enlargement of the image display area 802 and the degree of reduction of the image display area 802 are in proportion to the amount of the user's operation. The information processing apparatus 200 may also be designed so that the enlargement operation and the reduction operation can be performed in a random manner.

When the press of the image viewing button 800 by the user is detected, the information processing apparatus 200 requests the image pickup apparatus 100 to transmit related data that is related to image data recorded in the image pickup apparatus 100, specifically, headers, thumbnail images, and the like. In this case, the information processing apparatus 200 requests as many thumbnail images as the information processing apparatus 200 can display on the image viewing screen 816 in the default display size, and headers that are associated with the requested thumbnail images. The information processing apparatus 200 may request the image pickup apparatus 100 to transmit at least some of the remaining thumbnail images, which cannot be displayed on the image viewing screen 816 under the default condition because there are too many thumbnail images to display, and headers that are associated with the some of the remaining thumbnail images. When the information processing apparatus 200 receives, in advance, thumbnail images that cannot be displayed on the image viewing screen 816 under the default condition because there are too many thumbnail images to display, the image viewing screen 816 can be scrolled promptly when the operation of scrolling the image viewing screen 816 is performed by the user. When the user's scrolling operation, reduction operation, or similar operation creates the need to display thumbnail images that are not received yet by the information processing apparatus 200 from the image pickup apparatus 100 on the image viewing screen 816, the information processing apparatus 200 executes the following processing. That is, the information processing apparatus 200 requests the image pickup apparatus 100 to transmit the thumbnail images to be newly displayed and headers that are associated with the requested thumbnail images.

Display modes in which images recorded in the image pickup apparatus 100 are displayed in a list format on the display 206 of the information processing apparatus 200 are described below. When a transition takes place from the menu screen 815 of FIG. 8A to the image viewing screen

816*a* of FIG. 8B, thumbnail images are displayed in a list format in the normal mode 300 as described above. An example of the display of the image viewing screen 816*a* in the normal mode 300 is illustrated in FIG. 8B. The normal mode 300 is a mode for giving the user an overview of image data that is recorded in the image pickup apparatus 100 on the information processing apparatus 200. The normal mode 300 is expected to be used when the user searches a plurality of images for an image of his or her choice. It is therefore preferred in the normal mode 300 to display as many thumbnail images as possible in a list format on the image viewing screen 816*a* without lessening the ease of viewing too much. The display size of each image display area 802 in the normal mode 300 is accordingly set small as long as the ease of viewing is not lessened too much, to thereby display many image display areas 802 in the display area 801.

When the user's press of a "display" button 803, which is illustrated in FIG. 8B, is detected, the information processing apparatus 200 switches the display mode from the normal mode 300 to the detailed information display mode 302. An example of the display of the image viewing screen 816*c* in the detailed information display mode 302 is illustrated in FIG. 8D. The detailed information display mode 302 is a mode in which pairs of one image display area 802 and one detailed information display area 809 are displayed in a list format on the image viewing screen 816*c*. As illustrated in FIG. 8D, each detailed information display area 809 displays information on a thumbnail image that is displayed in its paired image display area 802, in the form of text, an icon, or the like. The detailed information display mode 302 in which information on a thumbnail image is displayed in association with the thumbnail image is useful when, for example, many pieces of image data similar to one another are recorded in the image pickup apparatus 100 and it is difficult to visually discriminate one piece of image data from another. In the detailed information display mode 302, one image display area 802 and one detailed information display area 809 are displayed side by side. A preferred display size of each detailed information display area 809 is a size that does not lessens the visibility of text, an icon, or other screen objects displayed in the detailed information display area 809 too much. A preferred display size of each image display area 802 is a size suited to the display size of each detailed information display area 809.

When the user's press of a "select" button 804, which is illustrated in FIG. 8B, is detected, the information processing apparatus 200 switches the display mode from the normal mode 300 to the image selection mode 301. An example of the display of the image viewing screen 816*b* in the image selection mode 301 is illustrated in FIG. 8C. The image selection mode 301 is a mode in which the user selects image data of his or her choice out of pieces of image data that are recorded in the image pickup apparatus 100, as image data to be saved on the information processing apparatus 200. When the user presses one of the image display areas 802 in the image selection mode 301, the information processing apparatus 200 puts image data that is associated with the pressed image display area 802 into a selected state. The information processing apparatus 200 displays a selection mark 806 in the pressed image display area 802, to thereby indicate that image data that is associated with the pressed image display area 802 is in a selected state. When the user presses again the pressed image display area 802 in which the selection mark 806 is displayed, the information processing apparatus 200 brings the image data that is associated with the pressed image display area 802 out of the selected state, and ceases displaying the selection mark 806 in this image display area 802. A selected image count display area 805 displays the number of pieces of image data that are in a selected state at present. In the image selection mode 301, where the user selects an image, a preferred display size of each image display area 802 is a size that is not excessively small. This is because, when the display size of each image display area 802 is excessively small, the user's finger may come into contact with the image display area 802 that the user does not intend to touch, and image data that the user has no intention of selecting is accidentally selected in such cases.

When the user's press of a "select" button 811, which is illustrated in FIG. 8D, is detected, the information processing apparatus 200 switches the display mode from the detailed information display mode 302 to the detailed information display and image selection mode 303. An example of the display of the image viewing screen 816*d* in the detailed information display and image selection mode 303 is illustrated in FIG. 8E. In the detailed information display and image selection mode 303, the user can select image data as in the image selection mode 301. Pairs of one image display area 802 and one detailed information display area 809 are displayed in a list format on the image viewing screen 816*d* in the detailed information display and image selection mode 303 as in the detailed information display mode 302. The detailed information display and image selection mode 303 enables the user to select image data while referring to detailed information that is displayed in association with a thumbnail image.

The display modes 300 to 303 differ from one another in purpose and in expected operation as described above. When the user is to take an overview of many images, it is preferred to increase the number of images that are displayed in a list format by setting the display size of each image display area 802 to be small. When image data is to be selected, on the other hand, it is preferred to set the display size of each image display area 802 to be rather large in order to avoid selecting a wrong image. When detailed information is displayed, text and other screen objects are desirably displayed in a display size that enables the user to easily read the text. The minimum display size of the image display area 802 is therefore set for each display mode separately in the embodiment. In any display mode, the information processing apparatus 200 does not reduce the image display area 802 to a display size that is smaller than the minimum display size in the display mode. For example, when the user performs a reduction operation while the image display area 802 is displayed in the minimum display size, the information processing apparatus 200 does not reduce the display size of the image display area 802 and keeps displaying the image display area 802 in the minimum display size.

The display size of each image display area 802 in the detailed information display and image selection mode 303 is suited to the display size of each detailed information display area 809 as in the detailed information display mode 302. The minimum display size of the image display area 802 in the detailed information display and image selection mode 303 is accordingly set to the same size as the minimum display size of the image display area 802 in the detailed information display mode 302.

In the embodiment, each thumbnail image is displayed so as to be inscribed in one of the image display areas 802 while maintaining the aspect ratio of the thumbnail image as described above. When the aspect ratio of the thumbnail image and the aspect ratio of the image display area 802 differ from each other, this means that the image display area 802 and the thumbnail image displayed in the image display area 802 have different sizes. When a thumbnail image that is greater in height than in width is displayed in one image display area 802, a top side and a bottom side of the thumbnail image are in contact with the image display area 802. The height of the thumbnail image and the height of the image display area 802 are equal to each other in this case, but the width of the thumbnail image is narrower than the width of the image display area 802, which leaves margins to the left and right of the thumbnail image in the image display area 802. When a thumbnail image that is greater in width than in height is displayed in one image display area 802, a left side and a right side of the thumbnail image are in contact with the image display area 802. The width of the thumbnail image and the width of the image display area 802 are equal to each other in this case, but the height of the thumbnail image is lower than the height of the image display area 802, which leaves margins to the top and bottom of the thumbnail image in the image display area 802.

While the description given here takes as an example a case where a thumbnail image is displayed so as to be inscribed in the image display area 802, the display of the thumbnail image is not limited thereto. For example, when a thumbnail image that is greater in width than in height is displayed in one image display area 802, a top side and a bottom side of the thumbnail image may be in contact with the image display area 802, and a part of a left portion of the thumbnail image and a part of a right portion of the thumbnail image may be trimmed so as not to be displayed in the image display area 802. Likewise, when a thumbnail image that is greater in height than in width is displayed in one image display area 802, a left side and a right side of the thumbnail image may be in contact with the image display area 802, and a part of an upper portion of the thumbnail image and a part of a lower portion of the thumbnail image may be trimmed so as not to be displayed in the image display area 802. In such cases, the thumbnail image is partially displayed in the image display area 802.

Switching from one display mode to another is described next. The default display mode for displaying images in a list format is the normal mode 300 as described above. When the user performs the operation of changing the current display mode, the information processing apparatus 200 switches the current display mode and stores a display mode after switching in, for example, the memory 204.

When the user presses the "display" button 803 on the image viewing screen 816*a* of the normal mode 300 as the one illustrated in FIG. 8B, the information processing apparatus 200 switches the display mode from the normal mode to the detailed information display mode 302. The information processing apparatus 200 then displays the image viewing screen 816*c* of the detailed information display mode 302 such as the one illustrated in FIG. 8D on the display 206. When the user presses the "select" button 804 on the image viewing screen 816*a* of the normal mode 300 such as the one illustrated in FIG. 8B, the information processing apparatus 200 switches the display mode from the normal mode 300 to the image selection mode 301. The information processing apparatus 200 then displays the image viewing screen 816*b* of the image selection mode 301 such as the one illustrated in FIG. 8C on the display 206. When the user presses a "back" button 814 on the image viewing screen 816*a* of the normal mode 300 such as the one illustrated in FIG. 8B, the information processing apparatus 200 displays the menu screen 815 such as the one illustrated in FIG. 8A on the display 206.

When the user presses a "cancel" button 807 on the image viewing screen 816*b* of the image selection mode 301 such as the one illustrated in FIG. 8C, the information processing apparatus 200 operates as follows. That is, the information processing apparatus 200 brings image data that is in a selected state out of the selected state, and switches the display mode from the image selection mode 301 to the normal mode 300. The information processing apparatus 200 then displays the image viewing screen 816*a* of the normal mode 300 such as the one illustrated in FIG. 8B on the display 206. When the user presses a "save" button 808 on the image viewing screen 816*b* of the image selection mode 301 such as the one illustrated in FIG. 8C, the information processing apparatus 200 operates as follows. That is, the information processing apparatus 200 executes processing of saving image data that is in a selected state and, after the saving processing is completed, switches the display mode from the image selection mode 301 to the normal mode 300. The information processing apparatus 200 then displays the image viewing screen 816*a* of the normal mode 300 such as the one illustrated in FIG. 8A on the display 206. The saving processing is achieved by receiving image data that is transmitted from the image pickup apparatus 100 by the information processing apparatus 200, and recording the received image data on the recording medium 210 by the information processing apparatus 200.

When the user presses a "display" button 810 on the image viewing screen 816*c* of the detailed information display mode 302 such as the one illustrated in FIG. 8D, the information processing apparatus 200 switches the display mode from the detailed information display mode 302 to the normal mode 300. The information processing apparatus 200 then displays the image viewing screen 816*a* of the normal mode 300 such as the one illustrated in FIG. 8B on the display 206. When the user presses the "select" button 811 on the image viewing screen 816*c* of the detailed information display mode 302 such as the one illustrated in FIG. 8D, the information processing apparatus 200 executes the following processing. That is, the information processing apparatus 200 switches the display mode from the detailed information display mode 302 to the detailed information display and image selection mode 303. The information processing apparatus 200 then displays the image viewing screen 816*d* of the detailed information display and image selection mode 303 such as the one illustrated in FIG. 8E on the display 206. When the user presses the "back" button 814 on the image viewing screen 816*c* of the detailed information display mode 302 such as the one illustrated in FIG. 8D, the information processing apparatus 200 displays the menu screen 815 such as the one illustrated in FIG. 8A on the display 206.

When the user presses a "cancel" button 812 on the image viewing screen 816*d* of the detailed information display and image selection mode 303 such as the one illustrated in FIG. 8E, the information processing apparatus 200 operates as follows. That is, the information processing apparatus 200 brings image data that is in a selected state out of the selected state, and switches the display mode from the detailed information display and image selection mode 303 to the detailed information display mode 302. The information processing apparatus 200 then displays the image viewing screen 816*c* of the detailed information display mode 302 such as the one illustrated in FIG. 8D on the display 206. When the user presses a "save" button 813 on the image viewing screen 816*d* of the detailed information display and image selection mode 303 such as the one illustrated in FIG.

8E, the information processing apparatus 200 executes the following processing. That is, the information processing apparatus 200 executes processing of saving image data that is in a selected state and, after the saving processing is completed, switches the display mode from the detailed information display and image selection mode 303 to the detailed information display mode 302. The information processing apparatus 200 then displays the image viewing screen 816c of the detailed information display mode 302 such as the one illustrated in FIG. 8D on the display 206.

In the embodiment, the minimum display size of the image display area 802 is set for each display mode separately as described above. The magnitude relation in the minimum display size of the image display area 802 among the display modes is as follows. That is, the normal mode 300 has the smallest value as the minimum display size of the image display area 802 out of all display modes. The detailed information display mode 302 and the detailed information display and image selection mode 303 have the largest value as the minimum display size of the image display area 802 out of all display modes. The minimum display size of the image display area 802 in the image selection mode 301 is larger than that in the normal mode 300 and smaller than that in the detailed information display mode 302 and the detailed information display and image selection mode 303. When the display mode is switched from the normal mode 300 to the image selection mode 301 while the image display area 802 is displayed in the minimum display size in the normal mode 300, the information processing apparatus 200 operates as follows. That is, the information processing apparatus 200 enlarges the display size of the image display area 802 when displaying the image viewing screen 816b of the image selection mode 301 on the display 206, to a size equal to the minimum display size in the image selection mode 301. When the display mode is switched from the detailed information display mode 302 to the normal mode 300 while the image display area 802 is displayed in the minimum display size in the detailed information display mode 302, the information processing apparatus 200 operates as follows. That is, the information processing apparatus 200 does not change the display size of the image display area 802 when displaying the image viewing screen 816a of the normal mode 300 on the display 206.

In this manner, when the minimum display size of the image display area 802 in the display mode after switching is larger than the minimum display size of the image display area 802 in the display mode before switching, the following processing is executed in the embodiment. That is, the display size of the image display area 802 is enlarged to the minimum display size in the display mode after switching. This applies to a transition 304 from the normal mode 300 to the detailed information display mode 302, a transition 306 from the normal mode 300 to the image selection mode 301, and a transition 310 from the image selection mode 301 to the detailed information display and image selection mode 303. On the other hand, when the minimum display size of the image display area 802 in the display mode after switching is smaller than the minimum display size of the image display area 802 in the display mode before switching, the display size of the image display area 802 is not changed. This applies to a transition 305 from the detailed information display mode 302 to the normal mode 300, a transition 307 from the image selection mode 301 to the normal mode 300, and a transition 311 from the detailed information display and image selection mode 303 to the image selection mode 301. Through execution of this processing, a switch from one display mode to another is accomplished without sacrificing the purposes and ease of operation of the respective display modes. The display size of the image display area 802 is not changed when the minimum display size of the image display area 802 in the display mode before switching and the minimum display size of the image display area 802 in the display mode after switching are equal to each other. This applies to a transition 308 from the detailed information display mode 302 to the detailed information display and image selection mode 303 and a transition 309 from the detailed information display and image selection mode 303 to the detailed information display mode 302.

When one display mode is switched to another display mode without an enlargement operation or a reduction operation, the information processing apparatus 200 compares a default display size that is set in an application program in advance to the minimum display sizes in the respective display modes. The image display area 802 is displayed in the default display size when the comparison indicates that the default display size is larger than the minimum display size in the display mode after switching. When the default display size is smaller than the minimum display size in the display mode after switching, on the other hand, the image display area 802 is displayed in the minimum display size in the display mode after switching.

<Operation of the Information Processing Apparatus and the Image Pickup Apparatus>

Figure 4A:
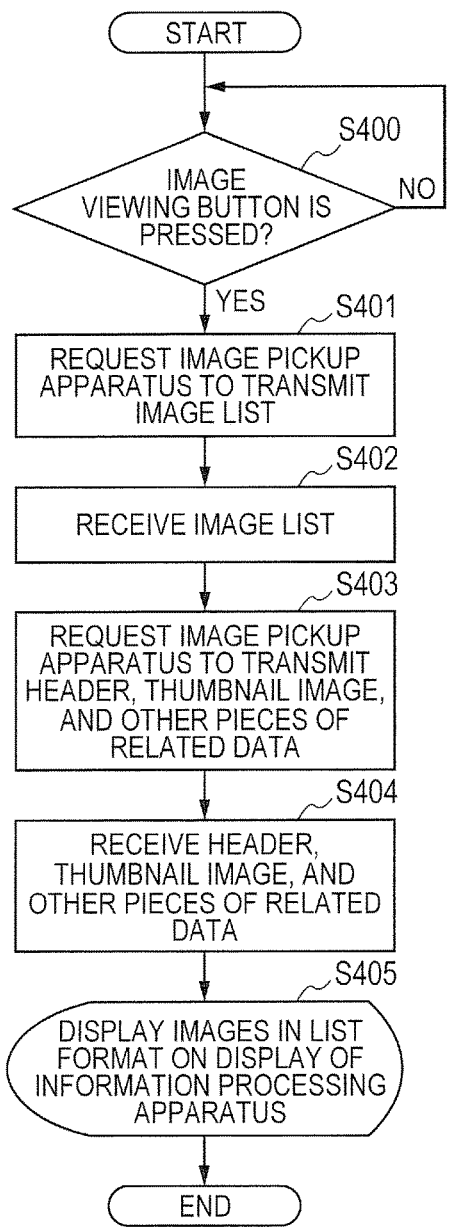
FIG. 4A and FIG. 4B are flow charts for respectively illustrating the operation of the information processing apparatus and the operation of the image pickup apparatus according to the embodiment.
Figure 4B:
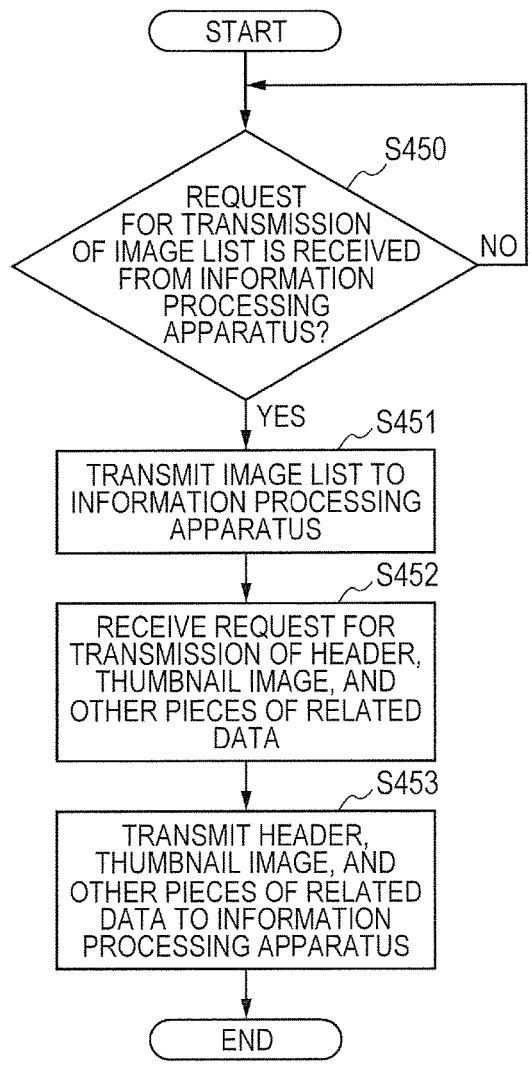

A description is given with reference to FIG. 4A and FIG. 4B on the operation of displaying, in a list format, images that are recorded in the image pickup apparatus 100 on the display 206 of the information processing apparatus 200. FIG. 4A is a flow chart for illustrating the operation of the information processing apparatus 200. The information processing apparatus 200 starts the processing illustrated in FIG. 4A by displaying the menu screen 815 such as the one illustrated in FIG. 8A on the display 206.

In Step S400, the information processing apparatus 200 determines whether or not the image viewing button 800 is pressed by the user. When the image viewing button 800 is pressed by the user ("YES" in Step S400), the information processing apparatus 200 proceeds to Step S401. In Step S401, the information processing apparatus 200 requests the image pickup apparatus 100 to transmit the image list described above. In Step S402, the information processing apparatus 200 receives the image list from the image pickup apparatus 100. In Step S403, the information processing apparatus 200 requests the image pickup apparatus 100 to transmit, for each of the images to be displayed in a list format on the image viewing screen 816, related data that is related to the image, namely, a header, a thumbnail image, and the like. In Step S404, the information processing apparatus 200 receives, for each of the images, the related data of the image, namely, a header, a thumbnail image, and the like, from the image pickup apparatus 100. In Step S405, the information processing apparatus 200 displays the image viewing screen 816 on the display 206 in a default display mode or a display mode that is set in advance. The thumbnail images are displayed in a list format on the image viewing screen 816. The display size of each image display area 802 displayed on the image viewing screen 816 in this step is the default display size or a minimum display size that is associated with the current display mode. When the default display size is smaller than the minimum display size that is associated with the current display mode, the image display area 802 is displayed in the minimum display size that is associated with the current display mode. The information processing apparatus 200 displays a plurality of thumbnail images in a list format by setting a plurality of image display areas 802 on the image viewing screen 816 and displaying the plurality of thumbnail images in the plurality of image display areas 802 on a one-to-one basis. Each thumbnail image undergoes enlargement/reduction processing to fit the display size of the image display area 802 before being displayed. Alternatively, each thumbnail image undergoes trimming processing to fit the display size of the image display area 802 before being displayed.

FIG. 4B is a flow chart for illustrating the operation of the image pickup apparatus 100. The image pickup apparatus 100 starts the processing illustrated in FIG. 4B when communication between the information processing apparatus 200 and the image pickup apparatus 100 is established. In Step S450, the image pickup apparatus 100 determines whether or not a request to transmit an image list is received from the information processing apparatus 200. The request to transmit an image list is the request transmitted from the information processing apparatus 200 to the image pickup apparatus 100 in Step S401 of FIG. 4A. When the request to transmit an image list is received ("YES" in Step S450), the image pickup apparatus 100 proceeds to Step S451. In Step S451, the image pickup apparatus 100 transmits the image list to the information processing apparatus 200. In Step S452, the image pickup apparatus 100 receives from the information processing apparatus 200 a request to transmit, for each image, related data of the image, namely, a header, a thumbnail image, and the like. In Step S453, the image pickup apparatus 100 transmits, for each image, related data of the image, namely, a header, a thumbnail image, and the like, to the information processing apparatus 200. The information processing apparatus 200 thus receives related data of each image, namely, a header, a thumbnail image, and the like, from the image pickup apparatus 100 in Step S404 of FIG. 4A.

<Operation of the Information Processing Apparatus Executed When Enlargement Operation or Reduction Operation is Performed>

Figure 5:
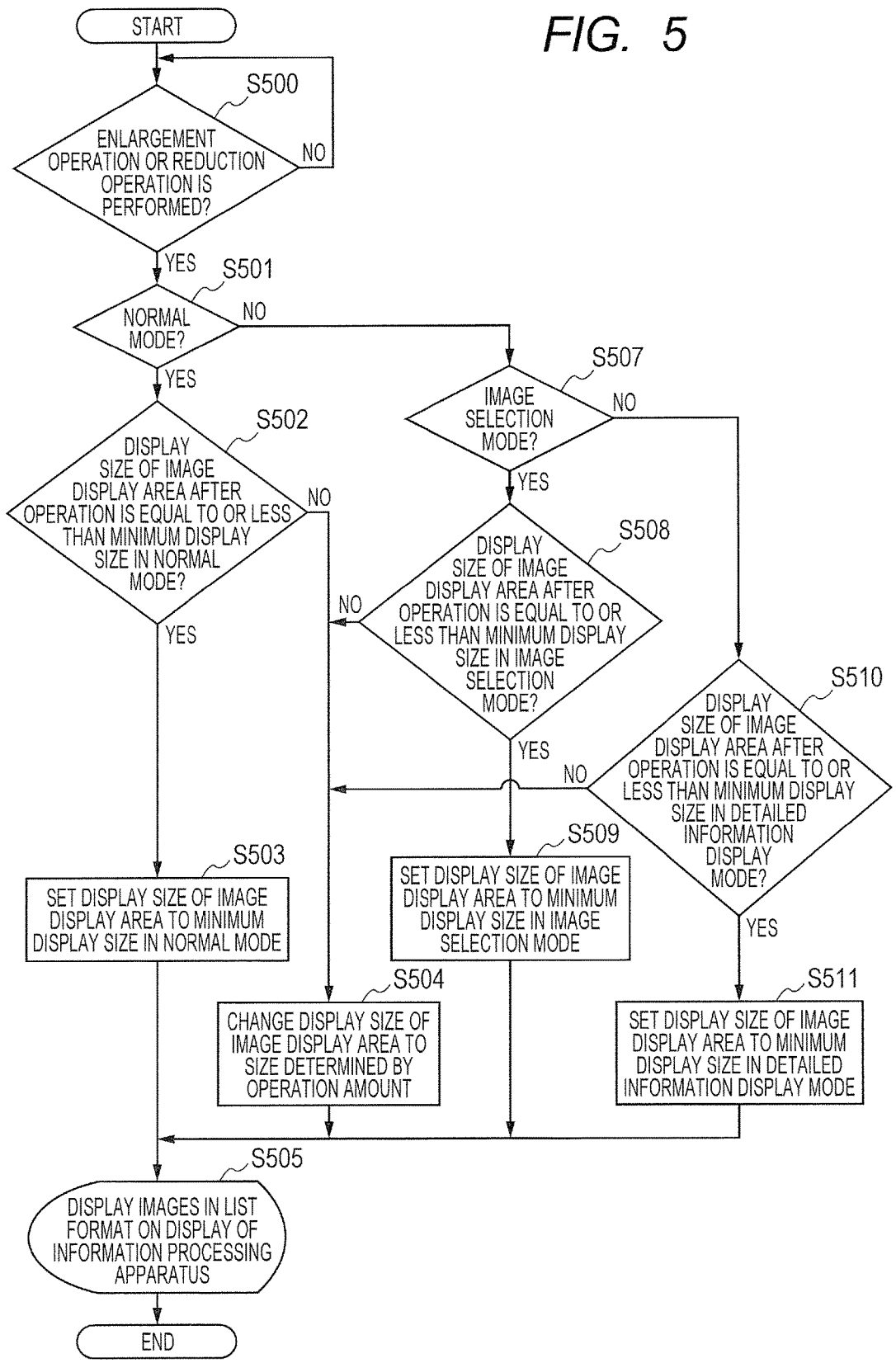
FIG. 5 is a flow chart for illustrating the operation of the information processing apparatus according to the embodiment.

A description is given next with reference to FIG. 5 on the operation of the information processing apparatus 200 that is executed when an enlargement operation or a reduction operation is performed. FIG. 5 is a flow chart for illustrating the operation of the information processing apparatus according to the embodiment. The information processing apparatus 200 starts the processing illustrated in FIG. 5 by displaying the image viewing screen 816 on the display 206 when the user presses the image viewing button 800 of FIG. 8A.

In Step S500, the information processing apparatus 200 determines whether or not an enlargement operation or a reduction operation is performed by the user, that is, whether or not an instruction to change the display size of each image display area 802 is received in response to the user's operation. When detecting that the enlargement operation or reduction operation is performed by the user ("YES" in Step S500), the information processing apparatus 200 proceeds to Step S501. In Step S501, the information processing apparatus 200 determines whether or not the current display mode is the normal mode 300. When the current display mode is the normal mode 300 ("YES" in Step S501), the information processing apparatus 200 proceeds to Step S502. In Step S502, the information processing apparatus 200 determines whether or not the display size of the image display area 802 after the enlargement operation or the reduction operation is equal to or less than the minimum display size in the normal mode 300. The comparison between the two may be made based on height or width. When the display size of the image display area 802 after the enlargement operation or the reduction operation is equal to or less than the minimum display size in the normal mode 300 ("YES" in Step S502), the information processing apparatus 200 proceeds to Step S503. In Step S503, the information processing apparatus 200 sets the display size of the image display area 802 to the minimum display size in the normal mode 300. When the display size of the image display area 802 after the enlargement operation or the reduction operation is larger than the minimum display size in the normal mode 300 ("NO" in Step S502), the information processing apparatus 200 proceeds to Step S504.

When the current display mode is not the normal mode 300 ("NO" in Step S501), the information processing apparatus 200 proceeds to Step S507. In Step S507, the information processing apparatus 200 determines whether or not the current display mode is the image selection mode 301. When the current display mode is the image selection mode 301 ("YES" in Step S507), the information processing apparatus 200 proceeds to Step S508. In Step S508, the information processing apparatus 200 determines whether or not the display size of the image display area 802 after the enlargement operation or the reduction operation is equal to or less than the minimum display size in the image selection mode 301. When the display size of the image display area 802 after the enlargement operation or the reduction operation is equal to or less than the minimum display size in the image selection mode 301 ("YES" in Step S508), the information processing apparatus 200 proceeds to Step S509. In Step S509, the information processing apparatus 200 sets the display size of the image display area 802 to the minimum display size in the image selection mode 301. When the display size of the image display area 802 after the enlargement operation or the reduction operation is larger than the minimum display size in the image selection mode 301 ("NO" in Step S508), the information processing apparatus 200 proceeds to Step S504.

When the current display mode is not the image selection mode 301 ("NO" in Step S507), the information processing apparatus 200 proceeds to Step S510. The current display mode in this case is one of the detailed information display mode 302 and the detailed information display and image selection mode 303. The minimum display size in the detailed information display mode 302 and the minimum display size in the detailed information display and image selection mode 303 are equal to each other. The display size of the image display area 802 after the enlargement operation or the reduction operation can therefore be compared to any of the minimum display size in the detailed information display mode 302 and the minimum display size in the detailed information display and image selection mode 303. In this case, the display size of the image display area 802 after the enlargement operation or the reduction operation is compared to the minimum display size in the detailed information display mode 302. In Step S510, the information processing apparatus 200 determines whether or not the display size of the image display area 802 after the enlargement operation or the reduction operation is equal to or less than the minimum display size in the detailed information display mode 302. When the display size of the image display area 802 after the enlargement operation or the reduction operation is equal to or less than the minimum display size in the detailed information display mode 302 ("YES" in Step S510), the information processing apparatus 200 proceeds to Step S511. In Step S511, the information processing apparatus 200 sets the display size of the image display area 802 to the minimum display size in the detailed information display mode 302. When the display size of the image display area 802 after the enlargement operation or the reduction operation is larger than the minimum display size in the detailed information display mode 302 ("NO" in Step S510), the information processing apparatus 200 proceeds to Step S504.

In Step S504, the information processing apparatus 200 changes the display size of the image display area 802 to a size determined by the amount of operation in the enlargement operation or the reduction operation. In Step S505, the information processing apparatus 200 displays the image viewing screen 816 on the display 206. A thumbnail image is displayed in each of the plurality of image display areas 802 set on the image viewing screen 816. Thumbnail images of image data recorded in the image pickup apparatus 100 are displayed in a list format on the display 206 of the information processing apparatus 200 in this manner. Each thumbnail image undergoes enlargement processing or reduction processing to fit the display size of the image display area 802 before being displayed. Alternatively, each thumbnail image undergoes trimming processing to fit the display size of the image display area 802 before being displayed.

Thus, when the user performs an enlargement operation or a reduction operation while thumbnail images are displayed on the image viewing screen 816, the information processing apparatus 200 in the embodiment operates as follows. That is, the information processing apparatus 200 changes the display size of each image display area 802 to a size that is no smaller than the minimum display size in the current display mode.

In the description given above, the minimum display size that is used in Steps S502, S508, and S510 is the same as the minimum display size that is used in Steps S503, S509, and S511. However, it is sufficient if the minimum display sizes are substantially equal to each other, and the two are not required to be an exact match. For instance, the minimum display size used for comparison may be set to 299 pixels by 299 pixels, whereas the minimum display size used for setting may be set to 300 pixels by 300 pixels. In this case, a minimum display size used for comparison and a minimum display size used for setting are associated with each display mode separately.

<Operation of the Information Processing Apparatus Executed when Display Mode is Switched>

A description is given next with reference to FIG. 6 on the operation of the information processing apparatus 200 that is executed when a display mode is switched. FIG. 6 is a flow chart for illustrating the operation of the information processing apparatus according to the embodiment. The information processing apparatus 200 starts the processing illustrated in FIG. 6 by displaying the image viewing screen 816 on the display 206 when the user presses the image viewing button 800 of FIG. 8A.

In Step S600, the information processing apparatus 200 determines whether or not one display mode is switched to another display mode by the user. When the display mode is switched by the user ("YES" in Step S600), the information processing apparatus 200 proceeds to Step S601. In Step S601, the information processing apparatus 200 compares the display size of the image display area 802 in the display mode before switching and the minimum display size of the image display area 802 in the display mode after switching. The information processing apparatus 200 then determines whether or not the result of the comparison shows that the display size of the image display area 802 in the display mode before switching is equal to or more than the minimum display size of the image display area 802 in the display mode after switching. When the display size of the image display area 802 in the display mode before switching is equal to or more than the minimum display size of the image display area 802 in the display mode after switching ("YES" in Step S601), the information processing apparatus 200 proceeds to Step S603. Specifically, the information processing apparatus 200 does not change the display size of the image display area 802 in this case. When the display size of the image display area 802 in the display mode before switching is smaller than the minimum display size of the image display area 802 in the display mode after switching ("NO" in Step S601), the information processing apparatus 200 proceeds to Step S602. In Step S602, the information processing apparatus 200 enlarges the display size of the image display area 802 so that the image display area 802 is displayed in the minimum display size in the display mode after switching. In other words, when one display mode is switched to another display mode, the display size of each image display area is selectively changed based on the result of comparison between the display size of the image display area in the display mode before switching and a minimum display size of the image display area that is associated with the display mode after switching, and the image display area is displayed in the display mode after switching.

In Step S603, the information processing apparatus 200 displays the image viewing screen 816 on the display 206. Details of the operation of displaying the image viewing screen 816 are described later with reference to FIG. 7A and FIG. 7B. In Step S604, the information processing apparatus 200 stores the display mode after switching in, for example, the memory 104.

Thus, when the display size of the image display area 802 that is set in the display mode before switching is smaller than the minimum display size in the display mode after switching, the information processing apparatus 200 in the embodiment executes the following processing. That is, when one display mode is switched to another display mode and the image display areas 802 are set, the information processing apparatus 200 sets the display size of each image display area 802 to the minimum display size in the display mode after switching. According to the embodiment, the lessening of the ease of operation that occurs when one display mode is switched to another display mode can therefore be prevented, and an information processing apparatus of high operability can be provided as a result.

<Operation of the Information Processing Apparatus and the Image Pickup Apparatus Executed to Display the Image Viewing Screen>

A description is given next with reference to FIG. 7A and FIG. 7B on the operation of the information processing apparatus 200 and the image pickup apparatus 100 that is executed to display the image viewing screen. FIG. 7A and FIG. 7B are flow charts for illustrating the operation of the information processing apparatus 200 and the operation of the image pickup apparatus 100 according to the embodiment. The operation of the information processing apparatus 200 is illustrated in FIG. 7A. The processing illustrated in FIG. 7A corresponds to Step S505 of FIG. 5 and Step S603 of FIG. 6. The display size of each image display area 802 is already set at the stage where the processing of FIG. 7A is started, in other words, at the stage where Step S505 of FIG. 5 or Step S603 of FIG. 6 is started, as described above.

In Step S700, the information processing apparatus 200 checks information necessary to display the image viewing screen 816. In Step S701, the information processing apparatus 200 determines whether or not cache data necessary to display an image in the image display area 802 is present in the information processing apparatus 200. The necessary cache data is data that is used to display a thumbnail image and so on in the image display area 802. Specifically, the necessary cache data is the related data described above, i.e., a header, a thumbnail image, and the like. When an image that is higher in resolution (pixel count) than a thumbnail image is required, the image higher in resolution than a thumbnail image also qualifies as cache data necessary to display an image in the image display area 802. When cache data necessary to display an image in the image display area 802 is not found in the information processing apparatus 200 ("NO" in Step S701), the information processing apparatus 200 proceeds to Step S702. When cache data necessary to display an image in the image display area 802 is found in the information processing apparatus 200 ("YES" in Step S701), on the other hand, the information processing apparatus 200 proceeds to Step S704.

In Step S702, the information processing apparatus 200 requests the image pickup apparatus 100 to transmit necessary information. When the number of image display areas 802 that are displayed in the display area 801 is increased by the user's reduction operation, for example, a thumbnail image to be newly displayed in the display area 801 and a header and other pieces of information that are related to the thumbnail image qualify as the necessary information. When an image to be displayed in one of the image display areas 802 after being enlarged by the user's enlargement operation is larger than a thumbnail image, an image higher in resolution than the thumbnail image qualifies as the necessary information.

In Step S703, the information processing apparatus 200 determines whether or not the necessary information is received from the image pickup apparatus 100. When the necessary information is received ("YES" in Step S703), the information processing apparatus 200 proceeds to Step S705. When the information processing apparatus 200 fails to receive the necessary information ("NO" in Step S703), on the other hand, the information processing apparatus 200 proceeds to Step S704. In Step S704, the information processing apparatus 200 makes preparations to display the image viewing screen 816 on the display 206 with the use of the cache data contained in the information processing apparatus 200. In Step S705, the information processing apparatus 200 displays the image viewing screen 816 on the display 206. Images are displayed in a list format on the display 206 of the information processing apparatus 200 in this manner.

The operation of the image pickup apparatus 100 is illustrated in FIG. 7B. The image pickup apparatus 100 starts the processing illustrated in FIG. 7B after completing the processing illustrated in FIG. 4B. In Step S750, the image pickup apparatus 100 determines whether or not a request to transmit information necessary to display the image viewing screen 816 is received from the information processing apparatus 200. The request is the one issued by the information processing apparatus 200 to the image pickup apparatus 100 in Step S702 of FIG. 7A. When the request from the information processing apparatus 200 is received ("YES" in Step S750), the image pickup apparatus 100 proceeds to Step S751.

In Step S751, the image pickup apparatus 100 prepares the necessary information in response to the request from the information processing apparatus 200. When the information processing apparatus 200 requests in Step S702 the image pickup apparatus 100 to transmit a thumbnail image to be newly displayed on the information processing apparatus 200 and a header and other pieces of data related to the thumbnail image, the image pickup apparatus 100 prepares the thumbnail image and the header and other pieces of related data. When the information processing apparatus 200 requests in Step S702 the image pickup apparatus 100 to transmit an image that is higher in resolution than a thumbnail image, the image pickup apparatus 100 prepares this image. The image pickup apparatus 100 then proceeds to Step S752. An image recorded in the image pickup apparatus 100, an image obtained by resizing the recorded image, or a Multi-Picture Format (MPF) image, for example, qualifies as the image higher in resolution than a thumbnail image. In Step S752, the image pickup apparatus 100 transmits the prepared necessary information to the information processing apparatus 200.

According to the embodiment, when the display size of each image display area 802 that is set in the display mode before switching is smaller than the minimum display size in the display mode after switching, the following processing is executed. That is, when one display mode is switched to another display mode and the image display areas 802 are set, the display size of each image display area 802 is set to the minimum display size in the display mode after switching. According to the present invention, the lessening of the ease of operation that occurs when one display mode is switched to another display mode can therefore be prevented, and an information processing apparatus of high operability can be provided as a result.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, while the embodiment described above takes as an example a case where the minimum display size of the image display area 802 is set for each of the display modes 300 to 303 separately, the present invention is not limited thereto. For example, a maximum display size of the image display area 802 may be set instead.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2016-130766, filed Jun. 30, 2016, which is hereby incorporated by reference wherein in its entirety.

What is claimed is:

1. An information processing apparatus, comprising:
a display controller configured to exert control such that an image is displayed on a display screen in one of a plurality of display modes, the plurality of display modes including a first display mode and a second display mode; and
a first comparison unit configured to compare, when the first display mode is switched to the second display mode, a display size of the image that is displayed on the display screen in the first display mode and a given display size that is associated with the second display mode,
wherein the display controller is configured to exert control such that the image is displayed on the display screen in the second display mode in either the given display size that is associated with the second display mode or the display size of the image that is displayed in the first display mode, based on a result of the comparison by the first comparison unit.

2. The information processing apparatus according to claim 1,
wherein the display controller is configured to exert control such that the image is displayed on the display screen in the second display mode in a changed display size, when the result of the comparison by the first comparison unit indicates that the display size of the image that is displayed in the first display mode is smaller than the given display size that is associated with the second display mode, the changed display size being the given display size that is associated with the second display mode, and
wherein the display controller is configured to exert control such that the image is displayed on the display screen in the second display mode in the display size of the image that is displayed in the first display mode, when the result of the comparison by the first comparison unit indicates that the display size of the image that is displayed in the first display mode is larger than the given display size that is associated with the second display mode.

3. The information processing apparatus according to claim 2,
wherein the first display mode is a display mode in which no image selection based on an operation by a user takes place on the display screen,
wherein the second display mode is a display mode in which the image is selected on the display screen based on the operation by the user, and
wherein the given display size that is associated with the second display mode is a minimum display size that is associated with the second display mode, the minimum display size that is associated with the second display mode being larger than a minimum display size that is associated with the first display mode.

4. The information processing apparatus according to claim 1,
wherein the display controller is configured to exert control such that the image is displayed on the display screen in the second display mode in a changed display size, when the result of the comparison by the first comparison unit indicates that the display size of the image that is displayed in the first display mode is larger than the given display size that is associated with the second display mode, the changed display size being the given display size that is associated with the second display mode, and
wherein the display controller is configured to exert control such that the image is displayed on the display screen in the second display mode in the display size of the image that is displayed in the first display mode, when the result of the comparison by the first comparison unit indicates that the display size of the image that is displayed in the first display mode is smaller than the given display size that is associated with the second display mode.

5. The information processing apparatus according to claim 1, further comprising:
a receiving unit configured to receive an instruction to change the display size of the image displayed on the display screen in response to an operation by a user; and
a second comparison unit configured to compare the changed display size of the image that is changed as instructed by the changing instruction and a given display size that is associated with a display mode in which the image is displayed,
wherein the display controller is configured to exert control such that the image is displayed on the display screen in the display size that is changed selectively depending on the result of the comparison by the second comparison unit, the changed display size being changed as instructed by the changing instruction.

6. The information processing apparatus according to claim 1, further comprising a communication unit configured to hold communication to and from another apparatus, to thereby obtain image data that is stored in the another apparatus,
wherein the display controller is configured to display on the display screen the image that corresponds to the image data stored in the another apparatus.

7. The information processing apparatus according to claim 6, wherein the another apparatus is an image pickup apparatus comprising an image pickup unit.

8. The information processing apparatus according to claim 1, wherein at least one display mode out of the plurality of display modes is a display mode for displaying text that represents information on the image on the display screen along with the image.

9. A method of controlling image display, comprising:
conducting a first comparison when a first display mode is switched to a second display mode out of a plurality of display modes, the first comparison being a comparison between a display size of an image that is displayed on a display screen in the first display mode and a given display size that is associated with the second display mode; and
exerting control such that the image is displayed on the display screen in the second display mode in either the given display size that is associated with the second display mode or the display size of the image that is displayed in the first display mode, based on a result of the first comparison.

10. A non-transitory computer-readable storage medium having stored thereon a program for causing a computer to function as:

a display controller configured to exert control such that an image is displayed on a display screen in one of a plurality of display modes, the plurality of display modes comprising a first display mode and a second display mode; and a first comparison unit configured to compare, when the first display mode is switched to the second display mode, a display size of the image that is displayed on the display screen in the first display mode and a given display size that is associated with the second display mode, wherein the display controller is configured to exert control such that the image is displayed on the display screen in the second display mode in either the given display size that is associated with the second display mode or the display size of the image that is displayed in the first display mode, based on a result of the comparison by the first comparison unit.

11. The non-transitory computer-readable storage medium according to claim 10, wherein the display controller is configured to exert control such that the image is displayed on the display screen in the second display mode in a changed display size, when the result of the comparison by the first comparison unit indicates that the display size of the image that is displayed in the first display mode is smaller than the given display size that is associated with the second display mode, the changed display size being the given display size that is associated with the second display mode, and wherein the display controller is configured to exert control such that the image is displayed on the display screen in the second display mode in the display size of the image that is displayed in the first display mode, when the result of the comparison by the first comparison unit indicates that the display size of the image that is displayed in the first display mode is larger than the given display size that is associated with the second display mode.

12. The non-transitory computer-readable storage medium according to claim 11, wherein the first display mode is a display mode in which no image selection based on an operation by a user takes place on the display screen, wherein the second display mode is a display mode in which the image is selected on the display screen based on the operation by the user, and wherein the given display size that is associated with the second display mode is a minimum display size that is associated with the second display mode, the minimum display size that is associated with the second display mode being larger than a minimum display size that is associated with the first display mode.

13. The non-transitory computer-readable storage medium according to claim 10, wherein the display controller is configured to exert control such that the image is displayed on the display screen in the second display mode in a changed display size, when the result of the comparison by the first comparison unit indicates that the display size of the image that is displayed in the first display mode is larger than the given display size that is associated with the second display mode, the changed display size being the given display size that is associated with the second display mode, and wherein the display controller is configured to exert control such that the image is displayed on the display screen in the second display mode in the display size of the image that is displayed in the first display mode, when the result of the comparison by the first comparison unit indicates that the display size of the image that is displayed in the first display mode is smaller than the given display size that is associated with the second display mode.

14. The non-transitory computer-readable storage medium according to claim 10, further comprising:

a receiving unit configured to receive an instruction to change the display size of the image displayed on the display screen in response to an operation by a user; and a second comparison unit configured to compare the changed display size of the image that is changed as instructed by the changing instruction and a given display size that is associated with a display mode in which the image is displayed, wherein the display controller is configured to exert control such that the image is displayed on the display screen in the display size that is changed selectively depending on the result of the comparison by the second comparison unit, the changed display size being changed as instructed by the changing instruction.

15. The non-transitory computer-readable storage medium according to claim 10, further comprising a communication unit configured to hold communication to and from another apparatus, to thereby obtain image data that is stored in the another apparatus, wherein the display controller is configured to display on the display screen the image that corresponds to the image data stored in the another apparatus.

* * * * *